United States Patent
Akatsuka et al.

(10) Patent No.: US 12,427,607 B2
(45) Date of Patent: Sep. 30, 2025

(54) FLUX AND SOLDER PASTE

(71) Applicant: SENJU METAL INDUSTRY CO., LTD., Tokyo (JP)

(72) Inventors: Shuta Akatsuka, Tokyo (JP); Kengo Ohta, Tokyo (JP); Sakie Okada, Tokyo (JP); Yutaka Hashimoto, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/833,928

(22) Filed: Jun. 7, 2022

(65) Prior Publication Data

US 2022/0402079 A1    Dec. 22, 2022

(30) Foreign Application Priority Data

Jun. 9, 2021    (JP) .................................. 2021-096581

(51) Int. Cl.
*B23K 35/362*    (2006.01)
*B23K 35/36*    (2006.01)

(52) U.S. Cl.
CPC ........ *B23K 35/362* (2013.01); *B23K 35/3612* (2013.01)

(58) Field of Classification Search
CPC .............. B23K 35/362; B23K 35/3612; B23K 35/3613; B23K 35/025
See application file for complete search history.

(56) References Cited

U.S. PATENT DOCUMENTS

| 4,290,824 A | * | 9/1981 | Cole ................... B23K 35/3613 148/23 |
| 2004/0250919 A1 | * | 12/2004 | Saito .................... B23K 35/362 148/25 |
| 2005/0056687 A1 | * | 3/2005 | Matsumoto ........ B23K 35/0222 228/248.1 |
| 2017/0304961 A1 | * | 10/2017 | Takagi ...................... F16B 5/08 |
| 2019/0015937 A1 | * | 1/2019 | Nakaji ..................... C08L 93/04 |

FOREIGN PATENT DOCUMENTS

| CN | 1709638 A | 12/2005 |
| CN | 101695794 | 4/2010 |
| CN | 105382445 A | 3/2016 |
| CN | 105451929 A | 3/2016 |
| CN | 110328467 | 10/2019 |
| CN | 111655421 A | 9/2020 |

(Continued)

OTHER PUBLICATIONS

Amino Daiki et.al. [JP2021053653A] (Computer-generated MC translation (Year: 2021).*

(Continued)

*Primary Examiner* — Danielle M. Carda
*Assistant Examiner* — Nazmun Nahar Shams
(74) *Attorney, Agent, or Firm* — NIXON PEABODY LLP; Jeffrey L. Costellia

(57) ABSTRACT

A flux containing: a rosin; a solvent (S); a thixotropic agent; and an activator is disclosed. The rosin contains a rosin amine. The solvent (S) contains a first solvent (S1) having a boiling point of 250° C. or less, and the amount of the first solvent (S1) relative to the total amount of the solvent (S) is 50% by mass or more and 100% by mass or less.

8 Claims, 1 Drawing Sheet

(56) References Cited

FOREIGN PATENT DOCUMENTS

| | | |
|---|---|---|
| JP | 32-007056 | 9/1957 |
| JP | 57-165198 | 10/1982 |
| JP | 02-104565 | 4/1990 |
| JP | 2017-108008 | 6/2017 |
| JP | 6643745 B1 | 2/2020 |
| JP | 2021-053653 | 4/2021 |
| TW | 201217353 | 5/2012 |

OTHER PUBLICATIONS

Yoshizawa Shinji [JP2013082004A] Computer-generated MC translation (Year: 2013).*
Taguchi Akitoshi et.al. [JPS57165198A] (Computer-generated MC translation attached). (Year: 1982).*
Hasegawa Yuuichi [JPS6064793A] (Computer-generated MC translation attached) (Year: 1985).*
Taguchi Akitoshi et.al. [JPS6064793A] (Computer-generated MC translation attached). (Year: 1982) (Year: 1982).*
Hasegawa Yuuichi [JPS57165198A] (Computer-generated MC translation (Computer-generated MC translation attached) (Year: 1985) (Year: 1985).*
Taiwanese Search Report (Application No. 111120666) mailed Dec. 9, 2022, (7pgs).
Japanese Notice of Reasons for Rejection for Application No. 2021-096581, mailed Sep. 7, 2021 (4 pages).
Chinese Search Report & Office Action for App. No. 202210555482.1, mailed Nov. 6, 2023 (9 pages) Partial Translation.

* cited by examiner

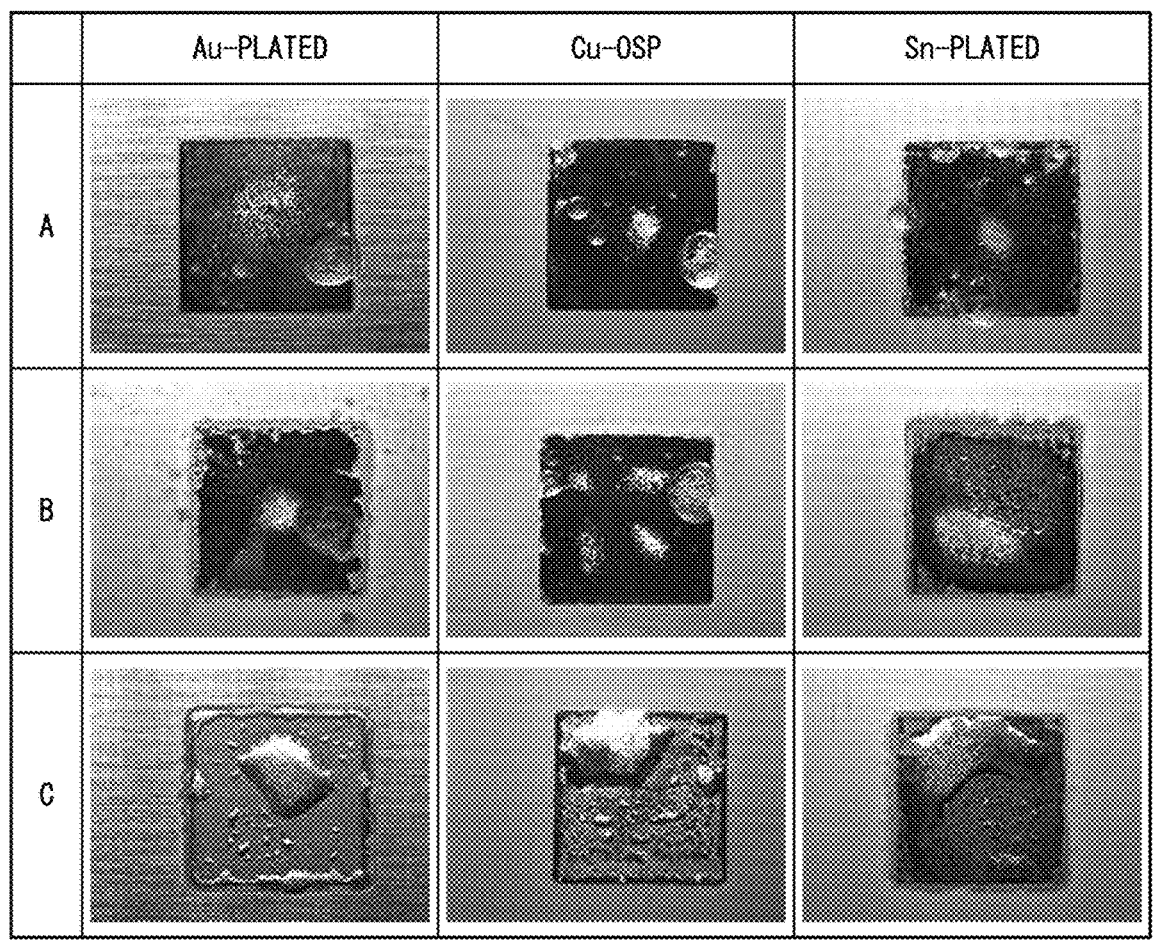

FLUX AND SOLDER PASTE

TECHNICAL FIELD

The present invention relates to a flux and a solder paste.

The present invention claims priority on the basis of Japanese Patent Application No. 2021-096581, filed in Japan on Jun. 9, 2021, the contents of which are incorporated herein by reference.

BACKGROUND OF THE INVENTION

A flux used to conduct soldering makes it possible to remove metallic oxides present in the metallic surface of an object to be joined by soldering and a solder, thereby allowing metallic elements to move at an interface therebetween. Accordingly, an intermetallic compound is formed therebetween by conducting soldering using the flux, and thus a strong joint is formed. Such a flux generally contains a resin component, a solvent, an activator, a thixotropic agent and the like.

A solder paste is a composite material obtained by mixing a solder alloy powder and a flux. When a solder paste is used to conduct soldering, a solder paste is printed on a substrate, parts are mounted thereon, and then the substrate on which the parts are mounted are heated in a heating furnace referred to as a reflow furnace.

There is a case in which an electrode of a substrate on which an electronic part is to be mounted is subjected to various surface treatments such as Au-plating, Cu-Organic Solderability Preservative (Cu-OSP) treatment, or Sn-plating, depending on the intended application. A flux and a solder paste are desired to exhibit favorable wettability against an electrode subjected to these various surface treatments.

In response to the above, fluxes containing rosin amine are used (see Patent Documents 1 and 2).

For example, Patent Document 1 discloses that a flux containing rosin amine exhibits sufficient cleaning activity against various types of plating.

In addition, Patent Document 2 discloses that a flux containing a rosin amine hydrohalogenic acid salt exhibits excellent wettability against copper.

DOCUMENTS OF RELATED ART

Patent Documents

Patent Document 1: Japanese examined patent application, second publication No. Sho 32-7056
Patent Document 2: Japanese unexamined patent application, first publication No. Sho 57-165198

SUMMARY OF THE INVENTION

Problems to be Solved by the Invention

However, there is a case in which the fluxes disclosed in Patent Documents 1 and 2 do not exhibit favorable wettability against an electrode subjected to various surface treatments after a reflow process.

The present invention aims to provide a flux and a solder paste which can enhance the wettability against an electrode subjected to various surface treatments.

Means to Solve the Problems

In order to solve the above-mentioned problems, the present invention adopts the following aspects.

(1) A flux containing: a rosin; a solvent (S); a thixotropic agent; and an activator, wherein the rosin contains a rosin amine, the solvent (S) contains a first solvent (S1) having a boiling point of 250° C. or less, and the amount of the first solvent (S1) relative to the total mass of the solvent (S) is 50% by mass or more and 100% by mass or less.

(2) The flux according to (1), wherein the boiling point of the first solvent (S1) is 150° C. or more and 250° C. or less.

(3) The flux according to (1) or (2), wherein the solvent (S) further contains a second solvent (S2) having a boiling point exceeding 250° C.

(4) The flux according to any one of (1) to (3), wherein the rosin amine contains dehydroabietylamine.

(5) The flux according to (4), wherein the rosin amine further contains dihydroabietylamine.

(6) A solder paste containing: a solder alloy powder; and the flux of any one of (1) to (5).

Effects of the Invention

The present invention makes it possible to provide a flux and a solder paste which can enhance the wettability against an electrode subjected to various surface treatments.

BRIEF DESCRIPTION OF DRAWINGS

FIG. 1 is a drawing illustrating photographs showing the wet state of each substrate subjected to Au-plating, Cu-OSP treatment or Sn-plating, followed by printing a solder paste thereon and reflowing the resultant, and illustrating evaluation criteria in terms of the wettability.

EMBODIMENTS FOR CARRYING OUT THE INVENTION (Flux)

A flux according to the present embodiment contains: a rosin; a solvent (S); a thixotropic agent; and an activator.

<Rosin>

In the present invention, the term "rosin" encompasses: natural resins including a mixture of an abietic acid as the main component and an isomer thereof; and ones obtained by chemically modifying natural resins (which may be referred to as rosin derivatives). The amount of the abietic acid in the natural resin is 40% by mass or more and 80% by mass or less relative to the total mass of the natural resin, for example. Representative examples of the isomer of the abietic acid include neoabietic acid, palustric acid, and levopimaric acid. The structure of the abietic acid is shown below.

In the present specification, the term "main component" refers to a component, the amount of which in a compound is 40% by mass or more relative to the total mass of components constituting the compound.

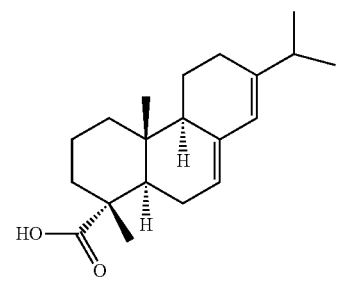

Abietic acid

In the present invention, the term "ones obtained by chemically modifying natural resins (rosin derivatives)" encompasses ones obtained by subjecting the above-mentioned "natural resin" to one or more treatments selected from the group consisting of hydrogenation, dehydrogenation, neutralization, alkylene oxide addition, amidation, dimerization, multimerization, esterification, and Diels-Alder cycloaddition.

<<Rosin Amine>>

A rosin contained in the flux according to the present embodiment includes a rosin amine as a rosin derivative.

Examples of the rosin amine include dehydroabietylamine and dihydroabietylamine.

One of the rosin amines may be used alone, or two or more thereof may be mixed to be used.

The term "rosin amine" means a so-called heterogeneous rosin amine.

Each structure of dehydroabietylamine and dihydroabietylamine is shown below.

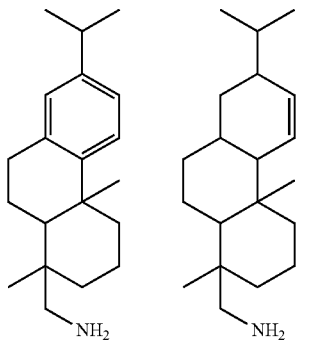

Dehydroabietylamine  Dehydroabietylamine

In the flux, the amount of the rosin amine relative to the total mass (100% by mass) of the flux is more than 0% by mass and 40% by mass or less, preferably 2% by mass or more and 30% by mass or less, more preferably 3% by mass or more and 20% by mass or less, even more preferably 3% by mass or more and 15% by mass or less, and particularly preferably 5% by mass or more and 10% by mass or less.

<<Other Rosin>>

As the rosin, other rosins may be contained in addition to the rosin amine.

Examples of the other rosins include: raw material rosins such as gum rosin, wood rosin and tall oil rosin; distilled rosin; and other rosin derivatives.

Examples of the other rosin derivatives include; hydrogenated rosin; polymerized rosin; polymerized hydrogenated rosin; heterogeneous rosin; acid-modified rosin; acid-modified hydrogenated rosin; anhydrous acid-modified hydrogenated rosin; acid-modified heterogeneous rosin; anhydrous acid-modified heterogeneous rosin; phenol-modified rosin; α,β unsaturated carboxylic acid-modified products (such as acrylated rosin, maleated rosin, and fumarated rosin); purified products, hydrogenated products and heterogeneous products of polymerized rosin; purified products, hydrogenated products and heterogeneous products of α,β unsaturated carboxylic acid-modified product; rosin alcohol; hydrogenated rosin alcohol; rosin ester; hydrogenated rosin ester; rosin soap; hydrogenated rosin soap; and acid-modified rosin soap.

One of the other rosins may be used alone, or two or more thereof may be mixed to be used.

Among them, one or more selected from the group consisting of polymerized rosin and acid-modified hydrogenated rosin is preferably used as the other rosin derivative.

Acrylic acid-modified hydrogenated rosin is preferably used as the acid-modified hydrogenated rosin.

In the flux, the total amount of the rosins relative to the total mass (100% by mass) of the flux is preferably 15% by mass or more and 60% by mass or less, more preferably 20% by mass or more and 50% by mass or less, and even more preferably 23% by mass or more and 45% by mass or less.

<Solvent (S)>

<<First Solvent (S1)>>

The solvent (S) contained in the flux according to the present embodiment contains a first solvent (S1) having a boiling point of 250° C. or less. The boiling point of the first solvent (S1) is preferably 150° C. or more and 250° C. or less.

In the present specification, the term "boiling point" means the temperature of a target liquid at which the saturated vapor pressure of the target liquid reaches one atmosphere. Examples of the solvent are described below. The solvent will be exemplified below. The temperature indicated in parentheses means the boiling point of the solvent.

Examples of the first solvent (S1) include: water; glycol ether-based solvents having a boiling point of 250° C. or less; terpineols having a boiling point of 250° C. or less; alcohol-based solvents having a boiling point of 250° C. or less; and ester-based solvents having a boiling point of 250° C. or less.

As the first solvent (S1), glycol ether-based solvents having a boiling point of 150° C. or more and 250° C. or less, terpineols having a boiling point of 150° C. or more and 250° C. or less, alcohol-based solvents having a boiling point of 150° C. or more and 250° C. or less, or ester-based solvents having a boiling point of 150° C. or more and 250° C. or less are preferably used.

Examples of the glycol ether-based solvents having a boiling point of 150° C. or more and 250° C. or less include phenyl glycol (237° C.), butyl carbitol (230.6° C.), and tripropylene glycol monomethyl ether (243° C.).

Examples of the terpineols having a boiling point of 150° C. or more and 250° C. or less include α-terpineol (218° C.), β-terpineol (210° C.), γ-terpineol (218° C.), terpineol mixtures (that is, mixtures containing: α-terpineol as the main component; and either 3-terpineol or γ-terpineol).

Examples of the alcohol-based solvents having a boiling point of 250° C. or less include 1,2-butanediol (192° C.), 2,2-dimethyl-1,3-propanediol (210° C.), 2,5-dimethyl-2,5-hexanediol (215° C.), 2,5-dimethyl-3-hexine-2,5-diol (206° C.), 2,3-dimethyl-2,3-butanediol (174° C.), hexylene glycol (197° C.), and 1-ethynyl-1-cyclohexanol (180° C.).

Examples of the alcohol-based solvents having a boiling point of 150° C. or more and 250° C. or less include 1,2-butanediol (192° C.), 2,2-dimethyl-1,3-propanediol (210° C.), 2,5-dimethyl-2,5-hexanediol (215° C.), 2,5-dimethyl-3-hexine-2,5-diol (206° C.), 2,3-dimethyl-2,3-butanediol (174° C.), hexylene glycol (197° C.), and 1-ethynyl-1-cyclohexanol (180° C.).

As the first solvent (S1), one or more selected from the group consisting of phenyl glycol (237° C.), butyl carbitol (230.6° C.), hexylene glycol (197° C.), and α-terpineol (218° C.) is preferably used.

One of the first solvent (S1) may be used alone, or two or more thereof may be mixed to be used.

<<Second solvent (S2)>>

The solvent (S) contained in the flux according to the present embodiment may contain a second solvent (S2) having a boiling point exceeding 250° C., in addition to the first solvent (S1).

Examples of the second solvent (S2) include glycol ether-based solvents having a boiling point exceeding 250° C., alcohol-based solvents having a boiling point exceeding 250° C., and ester-based solvent having a boiling point exceeding 250° C.

Examples of the glycol ether-based solvents having a boiling point exceeding 250° C. include hexyl diglycol (255° C.), 2-ethylhexyl diglycol (275° C.), diethylene glycol dibutyl ether (256° C.), triethylene glycol monobutyl ether (278° C.), triethylene glycol butylmethyl ether (261° C.), and tetraethylene glycol dimethyl ether (275° C.). Examples of the alcohol-based solvents having a boiling point exceeding 250° C. include isobornylcyclohexanol (318° C.), 2,4-diethyl-1,5-pentanediol (338° C.), 2-ethyl-2-hydroxymethyl-1,3-propanediol (395° C.), 2,2'-oxybis(methylene)bis (2-ethyl-1,3-propanediol) (448° C.), 1,2,6-trihydroxyhexane (386° C.), 1,4-cyclohexanediol (293° C.), 1,4-cyclohexane dimethanol (283° C.), 2,4,7,9-tetramethyl-5-decyne-4,7-diol (255° C.), and 2,2-bis(hydroxymethyl)-1,3-propanediol (437° C.).

Examples of the ester-based solvents having a boiling point exceeding 250° C. include bis(2-ethylhexyl)sebacate (377° C.).

One or more selected from the group consisting of hexyl diglycol (255° C.), 2-ethylhexyl diglycol (275° C.) and bis(2-ethylhexyl)sebacate (377° C.) is preferably used as the second solvent (S2).

One of the second solvents (S2) may be used alone, or two or more thereof may be mixed to be used.

The amount of the first solvent (S1) contained in the flux according to the present embodiment relative to the total mass of the S is 50% by mass or more and 100% by mass or less, preferably 60% by mass or more and 100% by mass or less, more preferably 70% by mass or more and 100% by mass or less, even more preferably 80% by mass or more and 100% by mass or less, and particularly preferably 90% by mass or more and 100% by mass or less.

The amount of the S contained in the flux according to the present embodiment relative to the total mass (100% by mass) of the flux is preferably 30% by mass or more and 80% by mass or less, and more preferably 40% by mass or more and 70% by mass or less.

<Thixotropic Agent>

Examples of the thixotropic agent include wax-based thixotropic agents, amide-based thixotropic agents, and sorbitol-based thixotropic agents.

One of the thixotropic agents may be used alone, or two or more thereof may be mixed to be used.

Examples of the wax-based thixotropic agents include ester compounds, and specific examples thereof include hardened castor oil.

The amount of the wax-based thixotropic agents in the flux relative to the total mass (100% by mass) of the flux is preferably 2% by mass or more and 10% by mass or less, more preferably 3% by mass or more and 8% by mass or less, and even more preferably 3% by mass or more and 6% by mass or less.

Examples of the amide-based thixotropic agents include monoamides, bisamides, and other polyamides.

Examples of the monoamides include lauramide, palmitamide, stearamide, behenamide, hydroxystearamide, saturated fatty acid amide, oleamide, erucamide, unsaturated fatty acid amide, p-toluamide, p-toluene methane amide, aromatic amide, hexamethylene hydroxystearamide, substituted amide, methylol stearamide, methylol amide, and fatty acid ester amide.

Examples of the bisamides include methylene bisstearamide, ethylene bislauramide, ethylene bishydroxy fatty acid (C6-24 fatty acid) amide, ethylene bisstearamide, ethylene bishydroxystearamide, saturated fatty acid bisamide, methylene bisoleamide, unsaturated fatty acid bisamide, m-xylylene bisstearamide, and aromatic bisamide.

Examples of the other polyamides include saturated fatty acid polyamide, unsaturated fatty acid polyamide, aromatic polyamide, 1,2,3-propane tricarboxylic acid tris(2-methylcyclohexyl amide), cyclic amide oligomer, and acyclic amide oligomer.

Examples of the cyclic amide oligomer include: amide oligomer formed by cyclic polycondensation of dicarboxylic acid and diamine; amide oligomer formed by cyclic polycondensation of tricarboxylic acid and diamine; amide oligomer formed by cyclic polycondensation of dicarboxylic acid and triamine; amide oligomer formed by cyclic polycondensation of tricarboxylic acid and triamine; amide oligomer formed by cyclic polycondensation of dicarboxylic acid, tricarboxylic acid and diamine; amide oligomer formed by cyclic polycondensation of dicarboxylic acid, tricarboxylic acid, and triamine; amide oligomer formed by cyclic polycondensation of dicarboxylic acid, diamine and triamine; amide oligomer formed by cyclic polycondensation of tricarboxylic acid, diamine and triamine, and amide oligomer formed by cyclic polycondensation of dicarboxylic acid, tricarboxylic acid, diamine and triamine.

Examples of the acyclic amide oligomer include: amide oligomer formed by acyclic polycondensation of monocarboxylic acid with diamine and/or triamine; and amide oligomer formed by acyclic polycondensation of dicarboxylic acid and/or tricarboxylic acid with monoamine. In the case of an amide oligomer containing either monocarboxylic acid or monoamine, the monocarboxylic acid or the monoamine serves as a terminal molecule, thereby resulting in an acyclic amide oligomer having a lowered molecular weight. Additional examples of the acyclic amide oligomer include amide compounds formed by acyclic polycondensation of dicarboxylic acid and/or tricarboxylic acid with diamine and/or triamine, the thus formed amide compounds being acyclic polymer-based amide polymers. Additional examples of the acyclic amide oligomer include amide oligomer formed by acyclic condensation of monocarboxylic acid and monoamine.

The total amount of the amide-based thixotropic agents in the flux relative to the total mass (100% by mass) of the flux is preferably 0% by mass or more and 30% by mass or less, and more preferably 4% by mass or more and 20% by mass or less.

Examples of the sorbitol-based thixotropic agents include dibenzylidene-D-sorbitol, bis(4-methylbenzylidene)-D-sorbitol, D-sorbitol, monobenzylidene-D-sorbitol, and mono(4-methylbenzylidene)-D-sorbitol.

The amount of the sorbitol-based thixotropic agents in the flux relative to the total mass (100% by mass) of the flux is preferably 0% by mass or more and 5.0% by mass or less, and more preferably 0% by mass or more and 3.5% by mass or less.

The total amount of the thixotropic agent contained in the flux according to the present embodiment relative to the total mass (100% by mass) of the flux is preferably 2% by mass or more and 20% by mass or less, more preferably 3% by mass or more and 10% by mass or less, and even more preferably 3% by mass or more and 6% by mass or less.

<Activator>

Examples of the activator include organic acids, halogen-based activators, and amines.

The flux according to the present embodiment preferably contains one or more selected from the group consisting of organic acids, halogen-based activators and amines.

Organic Acid:

Examples of the organic acids include glutaric acid, adipic acid, azelaic acid, eicosanedioic acid, citric acid, glycolic acid, succinic acid, salicylic acid, diglycolic acid, dipicolinic acid, dibutyl aniline diglycolic acid, suberic acid, sebacic acid, thioglycolic acid, dithioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, propionic acid, malic acid, p-anisic acid, stearic acid, 12-hydroxystearic acid, oleic acid, linoleic acid, linolenic acid, palmitic acid, pimelic acid, dimer acid, trimer acid, hydrogenated dimer acid which is a hydrogenated product formed by adding hydrogen to dimer acid, and hydrogenated trimer acid which is a hydrogenated product formed by adding hydrogen to trimer acid.

One of the organic acids may be used alone, or two or more thereof may be mixed to be used.

As the organic acid, a dicarboxylic acid is preferably used.

As a dicarboxylic acid, a glutaric acid is preferably used.

The total amount of the organic acids in the flux relative to the total mass (100% by mass) of the flux is preferably 1% by mass or more and 10% by mass or less, and more preferably 2% by mass or more and 6% by mass or less.

Halogen-based activator:

Examples of the halogen-based activators include halogenated aliphatic compounds and amine halogenated hydroacid salts.

One of the halogen-based activators may be used alone, or two or more thereof may be mixed to be used.

Examples of the halogenated aliphatic compounds include 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, 2,3-dibromo-1,4-butanediol, and trans-2,3-dibromo-2-butene-1,4-diol.

The amine halogenated hydroacid salts are compounds formed by reacting amine and hydrogen halide. Examples of the amine include ethyl amine, diethyl amine, triethyl amine, ethylene diamine, 1,3-diphenylguanidine, 1,3-di-o-tolylguanidine, and 1-o-tolylbiguanide. Examples of the hydrogen halide include hydrogenated products of chlorine, bromine, and iodine.

The flux according to the present embodiment preferably contains a halogen-based activator.

As the halogen-based activator, an amine halogenated hydroacid salt is preferably used.

Examples of the amine halogenated hydroacid salt include halogenated hydroacid salts of 1,3-diphenylguanidine.

As the halogenated hydroacid salt of 1,3-diphenylguanidine, 1,3-diphenylguanidineHBr is preferably used.

The total amount of the halogen-based activators in the flux relative to the total mass (100% by mass) of the flux is preferably 0% by mass or more and 5% by mass or less, more preferably 0.2% by mass or more and 3% by mass or less, and even more preferably 0.4% by mass or more and 2% by mass or less.

Amine:

Examples of the amines include ethylamine, triethylamine, ethylenediamine, triethylenetetramine, diphenylguanidine, 2-methylimidazole, 2-ethylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 5-phenyltetrazole.

One of the amines may be used alone, or two or more thereof may be mixed to be used.

As the amines, one or more selected from the group consisting of 2-ethylimidazole and diphenylguanidine is preferably used.

The amount of the amine in the flux relative to the total mass (100% by mass) of the flux is preferably 0% by mass or more and 20% by mass or less, more preferably 0% by mass or more and 10% by mass or less, and even more preferably 3% by mass or more and 10% by mass or less.

<Other Components>

The flux according to the present embodiment may further contain other components in addition to the rosin, the solvent, the thixotropic agent and the activator.

Examples of the other components include surfactants, silane coupling agents, and colorants.

Examples of the surfactants include nonionic surfactants and weak cationic surfactants.

Examples of the nonionic surfactant include polyethylene glycol, polyethylene glycol-polypropylene glycol copolymers, aliphatic alcohol polyoxyethylene adducts, aromatic alcohol polyoxyethylene adducts, and polyvalent alcohol polyoxyethylene adducts.

Examples of the weak cationic surfactants include diamine-terminated polyethylene glycol, diamine-terminated polyethylene glycol-polypropylene glycol copolymers, aliphatic amine polyoxyethylene adducts, aromatic amine polyoxyethylene adducts, and polyvalent amine polyoxyethylene adducts.

Examples of surfactants other than the above-mentioned surfactants include polyoxyalkylene acetylene glycols, polyoxyalkylene glyceryl ether, polyoxyalkylene alkyl ether, polyoxyalkylene ester, polyoxyalkylene alkyl amine, and polyoxyalkylene alkylamide.

The flux according to the present embodiment may further include an antioxidant so as to suppress oxidation of the solder alloy powder. As the antioxidant, a hindered phenolic antioxidant may be used.

The flux according to the present embodiment exhibits sufficient wettability against an electrode subjected to Au-plating treatment, Cu-OSP treatment, or Sn-plating treatment.

An electrode subjected to Cu-OSP treatment or Sn-plating treatment is hardly wetted, because the surface thereof is easily oxidized, in comparison with an electrode subjected to Au-plating treatment. Among these three types of the electrodes, the surface of the electrode subjected to Sn-plating treatment is oxidized most easily, therefore the electrode subjected to Sn-plating treatment is wetted least easily.

It is presumed that since the flux according to the present embodiment contains a rosin amine and a first solvent (S1) having a boiling point of 250° C. or less, in which the amount of the first solvent (S1) relative to the total mass of the solvent (S) is 50% by mass or more, the volatilization volume of the solvent is increased at a reflow process, and the concentration of the rosin and an activator is increased, as a result of which the wettability of the flux is enhanced.

(Solder Paste)

The solder paste according to the present embodiment contains a solder alloy powder and the above-mentioned flux.

The solder alloy powder may be composed of solder powder of: an elemental Sn; an alloy based on Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P or the like to the alloy.

The solder alloy powder may be composed of solder powder of a solder alloy obtained by adding Sb, Bi, In, Cu, Zn, As, Ag, Cd, Fe, Ni, Co, Au, Ge, P or the like to Sn—Pb based or Sn—Pb based alloy.

The solder alloy powder is preferably Pb-free solder.

Amount of flux:

In the solder paste, the amount of the flux relative to the total mass of the solder paste is preferably 5% by mass to 30% by mass, and more preferably 5% by mass to 15% by mass.

The solder paste according to the present embodiment exhibits sufficient wettability against an electrode subjected to various surface treatments.

It is presumed that since the solder paste according to the present embodiment contains a rosin amine and a first solvent (S1) having a boiling point of 250° C. or less, in which the amount of the first solvent (S1) relative to the total mass of the solvent (S) is 50% by mass or more, the volatilization volume of the solvent at a reflow process is increased and the concentration of the rosin and an activator is increased, as a result of which the wettability of the flux is improved.

The solder paste according to the present embodiment exhibits sufficient wettability against any of an electrode subjected to Au-plating treatment, an electrode subjected to Cu-OSP treatment, or an electrode subjected to Sn-plating treatment.

Specific constitutions of the embodiment according to the present invention are not limited to the embodiment described in the present specification, and may be modified, replaced or the like unless the gist of the disclosure is exceeded.

EXAMPLES

Although the present invention will be explained below by showing examples, the present invention is not limited to the following examples.

<Preparation of Flux>

Examples 1 to 12 and Comparative Examples 1 to 6

Each flux of examples and comparative examples was prepared by the constitution shown in Table 1 or 2.

Rosin:
Acrylic acid-modified hydrogenated rosin
Polymerized rosin
Rosin amine
First solvent (S1) having a boiling point or 250° C. or less:
Phenyl glycol (boiling point: 237° C.)
Butyl carbitol (boiling point: 230.6° C.)
α-Terpineol (boiling point: 218° C.)
Hexylene glycol (boiling point: 197° C.)
Second solvent (S2) having a boiling point exceeding 250° C.:
Hexyl diglycol (boiling point: 255° C.)
2-Ethylhexyl diglycol (boiling point: 275° C.)
Bis(2-ethylhexyl)sebacate (boiling point: 377° C.)

The content ratio shown in Tables 1 and 2 is indicated by "% by mass" when the total mass of the flux is indicated as 100% by mass, and a blank means 0% by mass.

<Preparation of Solder Paste>

The flux of each example and a solder alloy powder described below were mixed to prepare each solder paste. The prepared solder paste was composed of 10.5% by mass of the flux and 89.5% by mass of the solder alloy powder.

The solder alloy powder in the solder paste was a powder of solder alloy composed of 3% by mass of Ag, 0.5% by mass of Cu and a balance of Sn.

The solder alloy powder had a size (particle size distribution) satisfying Symbol 6 in the powder size classification (Table 2) in JIS Z 3284-1: 2014.

<Evaluation in Terms of Wettability>

(1) Verification Method

Three types of substrate were prepared by subjecting each substrate to Au-plating treatment, Cu-OSP treatment or Sn-plating treatment.

The land size was set to 8 mm×8 mm, the mask thickness was set to 80 m, and the prepared solder paste was printed on each substrate.

The substrate on which the solder paste was printed was reflowed.

As the reflow conditions, the temperature was increased to 150° C. at a temperature increase rate of 2° C./second, increased from 150° C. to 180° C. over 80 seconds, and maintained at 220° C. or more for 40 seconds while increasing the temperature from 180° C. to 240° C. at a temperature increase rate of 2° C./second.

The reflow process was conducted under $N_2$ atmospheric condition at an oxygen concentration of 80 ppm to 150 ppm.

The surface state of each substrate after the reflow process was evaluated in accordance with the following evaluation criteria.

(2) Evaluation Criteria

A: Solder wetted the printed surface uniformly.
B: Dewetting was generated at the periphery of the printed portion.
C: Dewetting was generated at half or more of the printed surface.

Photographs indicating the wet state of each substrate subjected to Au-plating, Cu-OSP treatment, or Sn-plating, followed by printing a solder paste thereon and then reflowing the resultant and the evaluation criteria of the wet state are shown in FIG. 1. In FIG. 1, the Au-plated substrates, the Cu-OSP-treated substrates, and the Sn-plated substrates are shown from the left side in this order and the wet states thereof were evaluated as A, B, and C from the top in this order.

Results of Examples 1 to 12 and Comparative Examples 1 to 6 are shown in Tables 1 and 2.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Rosin | | Acrylic acid-modified hydrogenated rosin | 10 | 10 | 10 | 10 | 20 | 10 | 10 | 10 | 10 |
| | | Polymerized rosin | 10 | 10 | 10 | 10 | 20 | 10 | 10 | 10 | 10 |
| | | Rosin amine | 3 | 5 | 10 | 15 | 5 | 5 | 5 | 5 | 3 |
| Solvent (S) | Second solvent (S2) | Hexyl diglycol | | | | | | | | | |
| | | 2-Ethylhexyl diglycol | | | | | | | | | |
| | | Bis(2-ethylhexyl) sebacate | | | | | | | | | |
| | First solvent (S1) | Phenyl glycol | | | | | | 65.2 | | | |
| | | Butyl carbitol | | | | | | | 65.2 | | |
| | | α-Terpineol | 67.2 | 65.2 | 60.2 | 55.2 | 48.2 | | | | 60 |
| | | Hexylene glycol | | | | | | | | 65.2 | |
| Thixotropic agent | | Hardened castor oil | 6 | 6 | 6 | 6 | 3 | 6 | 6 | 6 | 6 |
| Activator | Amine | Diphenyl guanidine | | | | | | | | | 5 |
| | | 2-Ethyl imidazole | | | | | | | | | 3 |
| | Organic acid | Glutaric acid | 3 | 3 | 3 | 3 | 3 | 3 | 3 | 3 | 3 |
| | Halogen-based activator | Diphenyl guanidine · HBr | 0.8 | 0.8 | 0.8 | 0.8 | 0.8 | 0.8 | 0.8 | 0.8 | |
| | S1/S (% by mass) | | 100.0 | 100.0 | 100.0 | 100.0 | 100.0 | 100.0 | 100.0 | 100.0 | 100.0 |
| | Total (% by mass) | | 100 | 100 | 100 | 100 | 100 | 100 | 100 | 100 | 100 |
| Evaluation in terms of wettability | | Au-plated | A | A | A | A | A | A | A | A | A |
| | | Cu-OSP | B | A | A | A | A | A | A | A | A |
| | | Sn-plated | B | A | A | B | A | A | A | A | A |

(Ex.: Example)

TABLE 2

| | | Ex. 10 | Ex. 11 | Ex. 12 | C.Ex. 1 | C.Ex. 2 | C.Ex. 3 | C.Ex. 4 | C.Ex. 5 | C.Ex. 6 |
|---|---|---|---|---|---|---|---|---|---|---|
| Rosin | Acrylic acid-modified hydrogenated rosin | 10 | 10 | 10 | 10 | 10 | 10 | 10 | 10 | 10 |
| | Polymerized rosin | 10 | 10 | 10 | 10 | 10 | 10 | 10 | 10 | 10 |
| | Rosin amine | 5 | 5 | 5 | 0 | 5 | 5 | 5 | 15 | 5 |
| Solvent (S) Second solvent (S2) | Hexyl diglycol | 25 | 33.6 | | | 65.2 | | | 55.2 | 42.2 |
| | 2-Ethylhexyl diglycol | | | | | | 65.2 | | | |
| | Bis(2-ethylhexyl) sebacate | | | 26.2 | | | | 37.2 | | |
| First solvent (S1) | Phenyl glycol | | | | | | | | | |
| | Butyl carbitol | | | | | | | | | |
| | α-Terpineol | | | 41 | 70.2 | | | | | |
| | Hexylene glycol | 42.2 | 33.6 | | | | | 30 | | 25 |
| Thixotropic agent | Hardened castor oil | 4 | 4 | 4 | 6 | 6 | 6 | 4 | 6 | 4 |
| Activator Amine | Diphenyl guanidine | | | | | | | | | |
| | 2-Ethyl imidazole | | | | | | | | | |
| Organic acid | Glutaric acid | 3 | 3 | 3 | 3 | 3 | 3 | 3 | 3 | 3 |
| Halogen-based activator | Diphenyl guanidine · HBr | 0.8 | 0.8 | 0.8 | 0.8 | 0.8 | 0.8 | 0.8 | 0.8 | 0.8 |
| S1/S (% by mass) | | 62.8 | 50.0 | 61.0 | 100.0 | 0.0 | 0.0 | 44.6 | 0.0 | 37.2 |
| Total (% by mass) | | 100 | 100 | 100 | 100 | 100 | 100 | 100 | 100 | 100 |
| Evaluation in terms of wettability | Au-plated | B | B | B | C | C | C | C | C | B |
| | Cu-OSP | B | B | B | C | C | C | C | C | B |
| | Sn-plated | B | B | B | C | C | C | C | C | C |

(Ex.: Example,
C.Ex.: Comparative Example)

The flux of Example 1 contained: acrylic acid-modified hydrogenated rosin, polymerized rosin, and 3% by mass of rosin amine, as rosins; α-terpineol as a first solvent (S1); glutaric acid and diphenylguanidine·HBr as activators; and hardened castor oil as a thixotropic agent, in which the amount of the first solvent (S1) relative to the total mass of the solvent was 100% by mass.

In the case of the flux of Example 1, the wet state of the Au-plated substrate was evaluated as A, the wet state of the Cu-OSP-treated glass epoxy substrate was evaluated as B, and the wet state of the Sn-plated substrate was evaluated as B.

Although the amount of the rosin amine in the flux of Examples 2 was increased to 5% by mass, the wet state of the Au-plated substrate was evaluated as A, the wet state of the Cu-OSP-treated glass epoxy substrate was evaluated as A, and the wet state of the Sn-plated substrate was evaluated as A.

Although the amount of the rosin amine in the flux of Example 3 was increased to 10% by mass, the wet state of the Au-plated substrate was evaluated as A, the wet state of the Cu-OSP-treated glass epoxy substrate was evaluated as A, and the wet state of the Sn-plated substrate was evaluated as A.

Although the amount of the rosin amine in the flux of Example 4 was increased to 15% by mass, the wet state of the Au-plated substrate was evaluated as A, the wet state of the Cu-OSP-treated glass epoxy substrate was evaluated as A, and the wet state of the Sn-plated substrate was evaluated as B.

Although the amount of the hardened castor oil in the flux of Example 5 was decreased to 3% by mass and each amount of the acrylic acid-modified hydrogenated rosin and the polymerized rosin was increased to 20% by mass, the wet state of the Au-plated substrate was evaluated as A, the wet state of the Cu-OSP-treated glass epoxy substrate was evaluated as A, and the wet state of the Sn-plated substrate was evaluated as A.

Although the flux of Example 6 contained phenyl glycol as the first solvent (S1), the wet state of the Au-plated substrate was evaluated as A, the wet state of the Cu-OSP-treated glass epoxy substrate was evaluated as A, and the wet state of the Sn-plated substrate was evaluated as A.

Although the flux of Example 7 contained butyl carbitol as the first solvent (S1), the wet state of the Au-plated substrate was evaluated as A, the wet state of the Cu-OSP-treated glass epoxy substrate was evaluated as A, and the wet state of the Sn-plated substrate was evaluated as A.

Although the flux of Example 8 contained hexylene glycol as the first solvent (S1), the wet state of the Au-plated substrate was evaluated as A, the wet state of the Cu-OSP-treated glass epoxy substrate was evaluated as A, and the wet state of the Sn-plated substrate was evaluated as A.

Although the flux of Example 9 contained diphenylguanidine and 2-ethylimidazole instead of diphenylguanidine HBr, the wet state of the Au-plated substrate was evaluated as A, the wet state of the Cu-OSP-treated glass epoxy substrate was evaluated as A, and the wet state of the Sn-plated substrate was evaluated as A.

Although the flux of Example 10 contained hexylene glycol as the first solvent (S1) and hexyl diglycol as the second solvent (S2), and the amount of the first solvent (S1) relative to the total mass of the solvents was decreased to 62.8% by mass, the wet state of the Au-plated substrate was evaluated as B, the wet state of the Cu-OSP-treated glass epoxy substrate was evaluated as B, and the wet state of the Sn-plated substrate was evaluated as B.

Although the amount of the first solvent (S1) relative to the total mass of the solvent (S) was decreased to 50% by mass in the flux of Example 11, the wet state of the Au-plated substrate was evaluated as B, the wet state of the Cu-OSP-treated glass epoxy substrate was evaluated as B, and the wet state of the Sn-plated substrate was evaluated as B.

Although the flux of Example 12 contained α-terpineol as the first solvent (S1) and bis(2-ethylhexyl)sebacate as the second solvent (S2), and the amount of the first solvent (S1) relative to the total mass of the solvents was decreased to 61% by mass, the wet state of the Au-plated substrate was evaluated as B, the wet state of the Cu-OSP-treated glass epoxy substrate was evaluated as B, and the wet state of the Sn-plated substrate was evaluated as B.

In the case of the flux of Example 1 in which a rosin amine was contained, the wet state of the Au-plated substrate was evaluated as A, the wet state of the Cu-OSP-treated glass epoxy substrate was evaluated as B, and the wet state of the Sn-plated substrate was evaluated as B.

In contrast, in the case of the flux of Comparative Example 1 in which a rosin amine was absent, all of the wet state of the Au-plated substrate, the Cu-OSP-treated glass epoxy substrate, and the Sn-plated substrate were evaluated as C.

In the case of the flux of Example 2 in which the amount of the first solvent (S1) relative to the total mass of the solvent (S) was 50% by mass or more and 100% by mass or less, all of the wet state of the Au-plated substrate, the Cu-OSP-treated glass epoxy substrate, and the Sn-plated substrate were evaluated as A.

In contrast, in the case of the fluxes of Comparative Examples 2 and 3 in which the amount of the first solvent (S1) relative to the total mass of the solvent (S) was less than 50% by mass, all of the wet state of the Au-plated substrate, the Cu-OSP-treated glass epoxy substrate, and the Sn-plated substrate were evaluated as C.

In the case of the fluxes of Examples 10 to 12 in which the amount of the first solvent (S1) relative to the total mass of the solvent (S) was 50% by mass or more and 100% by mass or less, all of the wet state of the Au-plated substrate, the Cu-OSP-treated glass epoxy substrate, and the Sn-plated substrate were evaluated as B.

In contrast, in the case of the flux of Comparative Example 4 in which the amount of the first solvent (S1) relative to the total mass of the solvent (S) was less than 50% by mass, all of the wet state of the Au-plated substrate, the Cu-OSP-treated glass epoxy substrate, and the Sn-plated substrate were evaluated as C.

In the case of the flux of Example 4 in which the amount of the first solvent (S1) relative to the total mass of the solvent (S) was 50% by mass or more and 100% by mass or less, the wet state of the Au-plated substrate was evaluated as A, the wet state of the Cu-OSP-treated glass epoxy substrate was evaluated as A, and the wet state of the Sn-plated substrate was evaluated as B.

In contrast, in the case of the flux of Comparative Example 5 in which the amount of the first solvent (S1) relative to the total mass of the solvent (S) was less than 50% by mass, all of the wet state of the Au-plated substrate, the Cu-OSP-treated glass epoxy substrate, and the Sn-plated substrate were evaluated as C.

In the case of the fluxes of Examples 10 to 12 in which the amount of the first solvent (S1) relative to the total mass of the solvent (S) was 50% by mass or more and 100% by mass or less, all of the wet state of the Au-plated substrate, the Cu-OSP-treated glass epoxy substrate, and the Sn-plated substrate were evaluated as B.

In contrast, in the case of the flux of Comparative Example 6 in which the amount of the first solvent (S1) relative to the total mass of the solvent (S) was less than 50% by mass, the wet state of the Au-plated substrate and the Cu-OSP-treated glass epoxy substrate was evaluated as B, but the wet state of the Sn-plated substrate was evaluated as C.

Since each flux and solder paste of Examples 1 to 12 according to the present invention contained a rosin amine and a first solvent (S1) having a boiling point of 250° C. or less, in which the amount of the first solvent (S1) relative to the total mass of the solvent (S) was 50% by mass or more, the solvent volatilization volume during reflow was increased and the concentrations of the rosin and the activator were increased, thereby realizing a sufficient wet state of the Au-plated substrate, Cu-OSP-treated glass epoxy substrate and Sn-plated substrate.

In addition, the fluxes of Examples 2 to 3 and 5 to 9 in which the amount of the rosin amine relative to the total amount of the flux was 5% by mass or more and 10% by mass or less and the amount of the first solvent (S1) relative to the total mass of the solvent (S) was 70% by mass or more and 100% by mass or less made it possible to realize excellent wettabilities against the Au-plated substrate, Cu-OSP-treated glass epoxy substrate and Sn-plated substrate.

INDUSTRIAL APPLICABILITY

A flux and a solder paste which can exhibit enhanced wettability against an electrode subjected to various surface treatments such as Au-plating, Cu-OSP treatment, or Sn-plating are provided. The flux and the solder paste are preferably used to join electrodes subjected to various surface treatments.

What is claimed is:

1. A flux consisting of:
   one or more rosins;
   a solvent(S);
   a thixotropic agent; and
   an activator,
   wherein
   a first rosin comprises a heterogeneous rosin amine consisting of dehydroabietylamine represented by a chemical formula below and dihydroabietylamine represented by a chemical formula below,
   the solvent(S) consists of a first solvent (S1) having a boiling point of 150° C. or more and 237° C. or less,
   the activator comprises one or more selected from the group consisting of an organic acid, a halogen-based activator and an amine,
   the organic acid is one or more selected from the group consisting of glutaric acid, adipic acid, azelaic acid, eicosanedioic acid, citric acid, glycolic acid, succinic acid, salicylic acid, dipicolinic acid, dibutyl aniline diglycolic acid, suberic acid, sebacic acid, thioglycolic acid, dithioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, propionic acid, malic acid, p-anisic acid, stearic acid, 12-hydroxystearic acid, oleic acid, linoleic acid, linolenic acid, palmitic acid, pimelic acid, dimer acid, trimer acid, hydrogenated dimer acid which is a hydrogenated product formed by adding hydrogen to dimer acid, and hydrogenated trimer acid which is a hydrogenated product formed by adding hydrogen to trimer acid, and an amount of the heterogeneous rosin amine relative to the total mass of the flux is 5% by mass or more and 10% by mass or less,

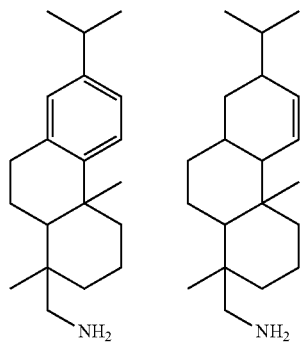

Dehydroabietylamine  Dihydroabietylamine.

2. The flux according to claim 1, the one or more rosins further comprises another rosin.

3. The flux according to claim 2, the another rosin is one or more selected from a hydrogenated rosin, a polymerized rosin, a polymerized hydrogenated rosin, a heterogeneous rosin, an acid-modified rosin, an acid-modified hydrogenated rosin, an anhydrous acid-modified hydrogenated rosin, an acid-modified heterogeneous rosin, an anhydrous acid-modified heterogeneous rosin, a phenol-modified rosin, an α,β unsaturated carboxylic acid-modified products, a purified product, a hydrogenated product or a heterogeneous product of a polymerized rosin, a purified product, a hydrogenated product or a heterogeneous product of an α,β unsaturated carboxylic acid-modified product, a rosin alcohol, a hydrogenated rosin alcohol, a rosin ester, a hydrogenated rosin ester, a rosin soap, a hydrogenated rosin soap, and an acid-modified rosin soap.

4. The flux according to claim 2, the another rosin is one or more selected from the group consisting of a polymerized rosin and an acid-modified hydrogenated rosin.

5. The flux according to claim 4, the acid-modified hydrogenated rosin is an acrylic acid-modified hydrogenated rosin.

6. A solder paste comprising: a solder alloy powder; and a flux of claim 1.

7. A flux consisting of:
a rosin;
a solvent(S);
a thixotropic agent;
an activator; and
one or more selected from the group consisting of a surfactant, a silane coupling agent, a colorant, and an antioxidant,
wherein
the rosin comprises a heterogeneous rosin amine consisting of dehydroabietylamine represented by a chemical formula below and dihydroabietylamine represented by a chemical formula below,
the solvent(S) consists of a first solvent (S1) having a boiling point of 150° C. or more and 237° C. or less,
the activator comprises one or more selected from the group consisting of an organic acid, a halogen-based activator and an amine,
the organic acid is one or more selected from the group consisting of glutaric acid, adipic acid, azelaic acid, eicosanedioic acid, citric acid, glycolic acid, succinic acid, salicylic acid, dipicolinic acid, dibutyl aniline diglycolic acid, suberic acid, sebacic acid, thioglycolic acid, dithioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, propionic acid, malic acid, p-anisic acid, stearic acid, 12-hydroxystearic acid, oleic acid, linoleic acid, linolenic acid, palmitic acid, pimelic acid, dimer acid, trimer acid, hydrogenated dimer acid which is a hydrogenated product formed by adding hydrogen to dimer acid, and hydrogenated trimer acid which is a hydrogenated product formed by adding hydrogen to trimer acid, and an amount of the heterogeneous rosin amine relative to the total mass of the flux is 5% by mass or more and 10% by mass or less,

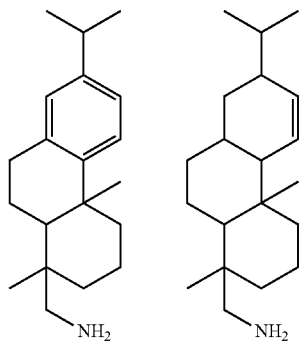

Dehydroabietylamine  Dihydroabietylamine.

8. A solder paste comprising: a solder alloy powder; and a flux of claim 7.

* * * * *